United States Patent
Song

(10) Patent No.: US 11,800,194 B2
(45) Date of Patent: Oct. 24, 2023

(54) METHOD AND DEVICE FOR LOADING ELECTRONIC PROGRAM GUIDE, AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Wenju Song, Beijing (CN)

(73) Assignee: BEIJING XIAOMI MOBILE SOFTWARE CO., LTD, Beijing (CN)

( * ) Notice: Subject to any disclaimer, the term of this patent is extended or adjusted under 35 U.S.C. 154(b) by 43 days.

(21) Appl. No.: 16/990,831

(22) Filed: Aug. 11, 2020

(65) Prior Publication Data

US 2021/0306708 A1  Sep. 30, 2021

(30) Foreign Application Priority Data

Mar. 30, 2020 (CN) .......................... 202010237096.9

(51) Int. Cl.
*H04N 21/482* (2011.01)
*H04N 21/475* (2011.01)

(52) U.S. Cl.
CPC ....... *H04N 21/482* (2013.01); *H04N 21/4755* (2013.01)

(58) Field of Classification Search
CPC ...... H04N 21/478; H04N 21/47; H04N 21/84; H04N 21/482; H04N 21/4755
See application file for complete search history.

(56) References Cited

U.S. PATENT DOCUMENTS 6,177,931 B1 * 1/2001 Alexander ....... H04N 21/44222
725/52
6,564,378 B1 * 5/2003 Satterfield ............ H04N 21/482
725/40
6,690,391 B1 * 2/2004 Proehl .................. G06F 3/0485
725/40

(Continued)

FOREIGN PATENT DOCUMENTS

CN  102968322 A  3/2013
CN  104268221 A  1/2015

(Continued)

OTHER PUBLICATIONS

First Office Action of the Chinese Application No. 202010237096.9, dated Sep. 2, 2021 with English translation (15p).

(Continued)

*Primary Examiner* — Ngoc K Vu
(74) *Attorney, Agent, or Firm* — Arch & Lake LLP

(57) ABSTRACT

Methods, devices, and non-transitory computer-readable storage mediums are provided for loading an EPG. In the method, channel data corresponding to a first window where a channel presently selected by a display device is located is determined according to the channel, where the channel data includes a channel identifier and program data. When the channel data corresponding to the first window is displayed, channel data corresponding to a second window and channel data corresponding to a third window are loaded, where the second window and the third window are windows adjacent to the first window in opposite directions, respectively.

13 Claims, 6 Drawing Sheets

(56) References Cited

U.S. PATENT DOCUMENTS

| | | | |
|---|---|---|---|
| 2002/0026496 A1* | 2/2002 | Boyer | H04N 21/4314 709/218 |
| 2003/0046695 A1* | 3/2003 | Billmaier | H04N 21/4438 348/E5.103 |
| 2006/0271951 A1 | 11/2006 | Ishizaki | |
| 2009/0249399 A1 | 10/2009 | Schlarb | |
| 2010/0083316 A1 | 4/2010 | Togashi et al. | |
| 2013/0179920 A1 | 7/2013 | Esaka | |
| 2017/0070785 A1* | 3/2017 | Zou | H04N 21/4821 |

FOREIGN PATENT DOCUMENTS

| | | | |
|---|---|---|---|
| CN | 104581414 A | 4/2015 | |
| CN | 105868241 A | 8/2016 | |
| CN | 106658218 A | 5/2017 | |
| CN | 108111905 A | 6/2018 | |
| CN | 108134960 A | 6/2018 | |
| CN | 108810647 A | 11/2018 | |
| CN | 109474839 A | 3/2019 | |
| EP | 2348724 A2 | 7/2011 | |
| WO | WO-2008123727 A1 * | 10/2008 | H04N 21/4382 |
| WO | WO-2009085525 A2 * | 7/2009 | H04N 21/47 |

OTHER PUBLICATIONS

Extended European Search Report in the European Application No. 20192892.6 dated Sep. 29, 2020, (9p).

* cited by examiner

| 7 days | 10:00 | | 11:00 | | 12:00 | | ... |
|---|---|---|---|---|---|---|---|
| channel 1 | | 1 | 2 | 3 | 4 | | ... |
| channel 2 | 1 | | 2 | | | 6 | ... |
| channel 3 | 1 | 2 | 3 | | 5 | 6 | ... |
| channel 4 | 1 | 2 | 3 | | 4 | 6 | ... |
| channel 5 | 1 | 2 | 3 | 4 | 5 | 6 | ... |
| channel 6 | 1 | 2 | 3 | | 5 | | ... |
| channel 7 | 1 | 2 | 3 | | 4 | 6 | ... |
| channel 8 | 1 | 2 | | 3 | | | ... |
| channel 9 | 1 | 2 | 3 | | 4 | | ... |
| channel 10 | | 1 | 3 | 4 | 5 | 6 | ... |
| channel 11 | | | 1 | | | | ... |
| channel 12 | 1 | 2 | | 3 | | 6 | ... |
| channel 13 | 1 | | 2 | 4 | 5 | 6 | ... |
| ... | ... | ... | ... | ... | ... | ... | ... |

Focus position
Played channel
Middle loading point
n channels

FIG. 2

| 7 days | 10:00 | 11:00 | 12:00 | ... |
|---|---|---|---|---|
| channel 1 | 1 | 2 | 3 | 4 | ... |
| channel 2 | 1 | | 2 | | 6 | ... |
| channel 3 | 1 | 2 | 3 | 5 | 6 | ... |
| channel 4 | 1 | 2 | 3 | 4 | 6 | ... |
| channel 5 | 1 | 2 | 3 | 4 | 5 | 6 | ... |
| channel 6 | 1 | 2 | 3 | | 5 | ... |
| channel 7 | 1 | 2 | 3 | 4 | 6 | ... |
| channel 8 | 1 | 2 | | 3 | | ... |
| channel 9 | 1 | 2 | 3 | | 4 | ... |
| channel 10 | 1 | 3 | 4 | 5 | 6 | ... |
| channel 11 | | | 1 | | ... |
| channel 12 | 1 | 2 | | 3 | | 6 | ... |
| channel 13 | 1 | 2 | | 4 | 5 | 6 | ... |
| ... | ... | ... | ... | ... | ... | ... |

Labels: Played channel, Focus position, n channels, Middle refresh point

FIG. 3

| 7 days | | 10:00 | 11:00 | | 12:00 | | ... |
|---|---|---|---|---|---|---|---|
| | channel 1 | 1 | 2 | 3 | 4 | | ... |
| | channel 2 | 1 | 2 | | | 6 | ... |
| | channel 3 | 1 | 2 | 3 | 5 | 6 | ... |
| | channel 4 | 1 | 2 | 3 | 4 | 6 | ... |
| | channel 5 | 1 | 2 | 3 | 4 | 5 | 6 | ... |
| | channel 6 | 1 | 2 | 3 | | 5 | ... |
| | channel 7 | 1 | 2 | 3 | 4 | | ... |
| | channel 8 | 1 | 2 | | 3 | | ... |
| | channel 9 | 1 | 2 | 3 | 4 | | ... |
| | channel 10 | 1 | 3 | 4 | 5 | 6 | ... |
| | channel 11 | | 1 | | | | ... |
| | channel 12 | 1 | 2 | 3 | | 6 | ... |
| | channel 13 | 1 | 2 | 4 | 5 | 6 | ... |
| | ... | ... | ... | ... | ... | ... | ... |

Focus position
Played channel
Middle loading point
n channels

FIG. 4

METHOD AND DEVICE FOR LOADING ELECTRONIC PROGRAM GUIDE, AND NON-TRANSITORY COMPUTER-READABLE STORAGE MEDIUM

CROSS-REFERENCE TO RELATED APPLICATION

This application claims priority to Chinese Patent Application No. 202010237096.9, filed on Mar. 30, 2020, the disclosure of which is hereby incorporated by reference in its entirety for all purposes.

TECHNICAL FIELD

The present disclosure relates to the technical field of smart televisions, and particularly, to a method and device for loading an electronic program guide (EPG), and a storage medium.

BACKGROUND

An EPG displayed on a display screen of a smart television is a function of presenting a list of programs that are now broadcast and will be broadcast in next few days on the digital television. EPG provides a user-friendly manner for a user to rapidly access a program of interest.

Under a normal condition, broadcast programs, channels and time are arranged on a user interface of an EPG in a matrix form, and the programs corresponding to the channels are displayed in sizes proportional to time lengths of the programs. However, such a display manner requires a long time for data loading before displaying, resulting in non-fluency phenomena such as long data delay or display non-fluency.

SUMMARY

The present disclosure provides a method and device for loading an EPG, and a storage medium.

According to a first aspect of embodiments of the present disclosure, a method for loading an EPG is provided. The method may include that: channel data corresponding to a first window where a channel presently selected by a display device is located is determined according to the channel, the channel data including a channel identifier and program data; and channel data corresponding to a second window and channel data corresponding to a third window are loaded when the channel data corresponding to the first window is displayed, the second window and the third window being windows adjacent to the first window in opposite directions, respectively.

According to a second aspect of the embodiments of the present disclosure, a device for loading an EPG is provided, which may include: a processor; and a memory storing instructions executable by the processor. The processor is configured to: determine, based on a channel presently selected by a display device, channel data corresponding to a first window where the channel is located, the channel data including a channel identifier and program data; and load channel data corresponding to a second window and channel data corresponding to a third window when the channel data corresponding to the first window is displayed, the second window and the third window being windows adjacent to the first window in opposite directions, respectively.

According to a third aspect of the embodiments of the present disclosure, a storage medium is provided, where instructions in the storage medium may be executed by a processor of a computer to enable the computer to execute the method for loading the EPG of the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 2 is a first example diagram of an EPG interface according to an embodiment of the present disclosure.

FIG. 3 is a second example diagram of an EPG interface according to an embodiment of the present disclosure.

FIG. 4 is a third example diagram of an EPG interface according to an embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
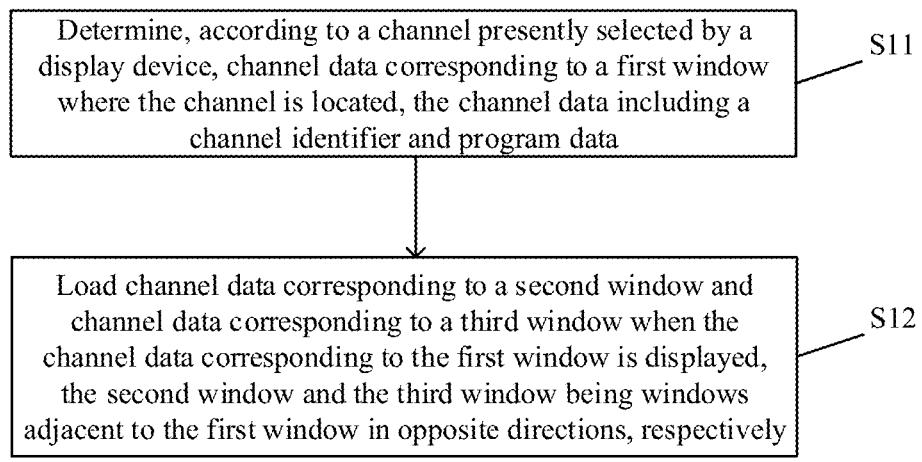
FIG. 1 is a flowchart of a method for loading an EGP according to an embodiment of the present disclosure.

FIG. 1 is a flowchart of a method for loading an EGP according to an embodiment of the present disclosure. As illustrated in FIG. 1, the method for loading the EPG may include the following operations. The method may be performed by.

In S11, first channel data corresponding to a first window where a channel presently selected by a display device is located is determined according to the channel, the channel data including a channel identifier and program data.

In S12, when the first channel data corresponding to the first window is displayed, second channel data corresponding to a second window and third channel data corresponding to a third window are loaded, the second window and the third window being windows adjacent to the first window in opposite directions, respectively. For example, the second window and the third window may be windows adjacent to the first window in the upward and downward directions. In another example, the second window and the third window may be windows adjacent to the first window in the leftward and rightward directions.

In the embodiment of the present disclosure, the display device may be a television, a smart television, a media player connected with a television, a digital set-top box, or any other electronic device in communication with a smart television. The method for loading the EPG may be performed at least partially by the television. When the television loads and displays an EPG, loaded and displayed channel data includes channel identifiers and program data corresponding to the channel identifiers.

It is to be noted that an EPG usually includes program data of 24 hours and, when the program data is displayed in time zones in sizes proportional to time lengths of programs, the program data may be required to be displayed in multiple pages, each page including the program data in different time zones. Therefore, in one or more embodiments of the present disclosure, program data displayed on a display interface is part of program data corresponding to channel data and the part of program data is program data in a page that a present time zone belongs to. The present time zone is a time zone of a home location of a channel that the presently displayed program data belongs to.

In some embodiments of the present disclosure, the channel identifier refers to information related to the channel, for example, one or more of a channel number identifier, a channel icon identifier, and a channel owner.

The program data includes data of programs planned to be broadcast in one or more channels, for example, one or more of a program name, a program type, and a brief introduction to a program content.

Each channel identifier and program data are displayed in a control form such that a user may conveniently select a desired channel and program.

The channel identifier is only a single character string that has a small data amount. However, the program data of each channel includes program names, types, details, and the like, which may involve data of about 7 days. Further, the program data of each channel may change or update from time to time and is required to be acquired in real time to be accurately displayed. Thus, the program data of each channel has a much larger data amount than the channel identifier. Therefore, when the EPG is loaded and displayed, the following problems may exist.

(1) If all program data corresponding to channel identifiers is loaded at one time, the loading speed may be relatively low. In addition, even though the program data corresponding to all the channel identifiers is loaded in batches in different periods of time, there may still be the problem of loading non-fluency or lag.

(2) After the user opens the EPG, a page focus should be at a playback position. If all the channel identifiers and the program data corresponding to the channel identifiers are loaded every time when the EPG is entered, it is necessary to scroll pages to a corresponding position and acquire a focus through a specified control.

In some embodiments of the disclosure, the focus control is a control selected by the focus, and the control selected by the focus is in an activated state. When a confirmation operation for the control selected by the focus is received, a response may be given to the operation corresponding to the control selected by the focus. A control not selected by the focus is in an inactivated state, and no response may be given to a corresponding confirmation operation. For example, the control is presented in a different color or brightness or the control is presented in a dynamic changing manner. However, it is to be noted that, when the EPG is opened for the first time or a program playing interface is switched to the EPG, the focus control refers to a control obtained after highlighted identification processing is performed on a channel identifier (channel control) corresponding to a program recorded in the display device and watched by the user last time or a control obtained after highlighted identification processing is performed on program data (program control) corresponding to the channel identifier.

Therefore, a window loading manner is adopted in the present disclosure. Since all channel identifiers have been determined during channel searching, all the channel identifiers may be loaded in multiple windows according to the total number of the channel identifiers. One window may include multiple channel identifiers.

In S11, the display device may determine, based on the channel presently selected by the display device, the channel data corresponding to the first window where the channel is located.

It is to be noted that the display device includes, but not limited to, a smart television. The channel presently selected by the display device may refer to a channel identifier which is recorded when the display device opens the EPG for the first time based on an instruction of the user for starting the display device and where the user stays when the display device is used last time. The channel presently selected by the display device may also refer to a channel identifier recorded by the display device after switching of a program data playing interface to the EPG interface by the user and corresponding to program data played before switching.

In the present disclosure, the channel identifiers are allocated to different windows according to the total number of the channel identifiers, so that the first window where the channel presently selected by the display device is located and the channel data in the first window may be determined according to the channel. After the channel data corresponding to the first window is determined, the display device may display the channel data corresponding to the first window. The channel data includes the channel identifier belonging to the first window and the program data corresponding to the channel identifier in the present time zone.

Under some conditions, a window-based loading manner is adopted. Herein, window-based loading refers to loading and displaying window by window. A display content corresponding to a window may be considered as a display content of a page.

The window-based (page-based) loading manner only loads page by page from the first page in a single direction. For example, data of the EPG is divided into four pages based on the channel identifiers, and during first loading, loading is required to be started from the first page. A characteristic of the EPG is that the played channel is included every time when the EPG is entered, and if the channel presently selected by the display device is in the last page (for example, the fourth page), the EPG is required to be loaded page by page from the first page and slide to the last page. The manner of loading page by page from the first page may cause a serious performance problem because many controls (including the channel identifiers and the program data) are required to be initialized. In addition, the program data changes in real time and the control is required to be re-drawn before displaying, so that the manner of loading page by page from the first page may cause some useless program data (information drawn on the control) to be cached.

In the present disclosure, the display device determines the first window corresponding to the channel presently selected by the display device in advance according to the channel, thereby displaying the channel data corresponding to the first window. For example, when it is determined that the channel is in the fourth page (i.e., the first window), the channel identifier and program data corresponding to the fourth page are directly loaded. Compared with the manner of loading page by page from the first page and the manner of loading all the data of the EPG at one time, the loading manner in the present disclosure has the advantages that unnecessary data loading may be reduced, a cache overhead may be reduced, and the channel data in the first window may be displayed faster, so that the user experience is improved.

In addition, in the present disclosure, when the channel data corresponding to the first window is displayed, the channel data corresponding to the second window and the channel data corresponding to the third window are further loaded in S12, the second window and the third window being windows adjacent to the first window in opposite directions, respectively.

When the manner of loading page by page from the first page is adopted, a bottom loading manner is adopted, and after a page turning instruction input based on an operation of the user over a remote controller is detected, a new page is started to be loaded. The manner of starting loading a new page based on triggering of the user requires time for loading, so that the display device may not present the new page in real time.

In some embodiments of the present disclosure, the channel data in the second window and third window which are adjacent to the first window is loaded at the same time when the first window is loaded and displayed, and when window switching of the user for the channel data is detected, the display device may rapidly present the channel data in the second window or the third window based on advanced loading, so that the user experience may be improved.

It is to be noted that, as mentioned above, the first window may include multiple channel identifiers and program data corresponding to the channel identifiers in the present time zone. In the present disclosure, when the channel data corresponding to the second window and third window which are adjacent to the first window is loaded, the channel data corresponding to the second window and the third window may be loaded according to channel identifiers.

In one or more embodiments, the operation of loading the channel data corresponding to the second window and the channel data corresponding to the third window may include that:

when a focus position is at a middle of a channel identifier region of the channel data corresponding to the first window, the channel data corresponding to the second window and the channel data corresponding to the third window are loaded. Here, the middle of the channel identifier region may be preset based on the screen size of the display device or the size of the channel identifier region. For example, the middle position may be referred as "middle loading point", "middle refresh point", or "middle loading point", respectively in FIGS. 2-4.

As mentioned above, the focus control refers to a control presently identified in a highlighted state. Based on displaying of the channel data in the first window, the display device may receive a channel selection instruction of the user and make a corresponding channel identifier (control) become the focus based on the instruction. For example, the channel control is presented in a different color or brightness, or the user is prompted in the dynamic changing manner that the channel control is a channel of interest of the user.

In some embodiments, when the focus is at the middle position of the channel identifier region of the channel data corresponding to the first window, the channel data corresponding to the second window and the channel data corresponding to the third window are loaded. For example, if the first window includes three channel identifiers and the three channel identifiers are arranged according to a sequence from the first to the third or from the third to the first, when the focus is the second channel identifier, the channel data corresponding to the second window and the channel data corresponding to the third window are loaded. In the present disclosure, the channel identifier which is the focus at the middle position of the channel identifier region of the channel data corresponding to the first window is called a middle loading point.

Here, when the focus position is at the middle of the channel identifier region of the channel data corresponding to the first window, the channel data corresponding to the second window and the channel data corresponding to the third window are triggered to be loaded. It can be understood that, when the user moves the focus position to the middle position of the channel identifier region of the channel data corresponding to the first window, it is also indicated that the user may switch the window in any direction. The disclosed methods reserve more time to load the channel data in the second window and the third window by triggering loading when detecting that the focus is at the middle of the channel identifier region in the first window. By contrast, if the channel data in the third window is triggered to be loaded responsive to detecting that the focus position is at the channel identifier corresponding to a bottom position in the first window, there may be not enough time to load the channel data when the display device receives an instruction of switching the present focus position to the channel data in the third window, which result in longer waiting time to the user. In sum, the disclosed methods enable the channel data in the second and third window to be completely loaded within the reserved time and thus reducing waiting time by the user when switching to adjacent windows. It can be understood that the manner of the present disclosure is more intelligent and the user experience may be improved.

FIG. 2 is a first example diagram of an EPG interface according to an embodiment of the present disclosure. As illustrated in FIG. 2, the EPG is presented in form of a two-dimensional matrix. The vertical axis (i.e., y direction) represents the channel identifier, and the horizontal axis (i.e., x direction) represents program data corresponding to different time zones in 7 days. A window includes three channel identifiers and program data corresponding to the channel identifiers in a present time zone. In the example, the presently played channel recorded by the display device is the fifth channel (i.e., "channel 5"), and when the EPG is entered, the display device may calculate that the first window corresponding to the presently played channel is a window that "channel 4" to "channel 6" belong to and simultaneously load channel data in the first window and channel data in upper and lower two adjacent windows (i.e., the second window that "channel 11" to "channel 13" belong to and the third window that "channel 7" to "channel 9" belong to). However, it is to be noted that only the channel data of the first window is displayed on the display device, the first window including channel identifiers of "channel 4" to "channel 6" and program data corresponding to the channel identifiers in a present time period (i.e., 10:00-11:00). In addition, it can also be seen from FIG. 2 that a present focus position is the program data corresponding to "channel 4" in the first window.

In one or more embodiments, the method may further include that:

when the focus position is a middle time zone position of a program data region of the channel data corresponding to the first window, program data in data pages adjacent to a present program data page is loaded.

In the embodiment, for accelerating displaying of the program data, a manner the same as the manner of loading the channel data in the second window and the channel data in the third window according to the middle loading point of the first window for the channel identifier may also be adopted, and when the focus position is at the middle of the present program data, the program data of two data pages adjacent to the present program data page is loaded. It is to be noted that both the present program data and the program data of the two adjacent data pages correspond to the channel identifier of the present display window and only time zones corresponding to the present program data and the program data in the two adjacent data pages are different.

It is to be noted that the focus position is at the middle of the present program data and the middle position may be program data at the middle position in all the program data. For example, three pieces of program data are displayed in the first window that is presently displayed. Specifically, 10:00-10:15 corresponds to a program "1", 10:15-10:45 corresponds to a program "2", and 10:45-11:00 corresponds to a program "3". In such case, if the focus position is the program "2", program data of two data pages adjacent to the present data page may be loaded.

In some embodiments, the program data of the two adjacent data pages is triggered to be loaded when the focus position is the middle position of the time zone of the presently displayed program data. It can be understood that, when the focus is at the middle position of the time zone of the program data, it is indicated that the user may switch the program data in any direction. Therefore, more time may be reserved to load the program data in the two adjacent data pages, waiting time when the user switches the program data of different time zones may be reduced, and the user experience may be improved.

In one or more embodiments, the method for loading the EPG may further include that:

a first switching instruction acting on the channel identifier of the channel data corresponding to the first window is detected; and the displayed channel data is switched to the channel data corresponding to the second window or the channel data corresponding to the third window based on the loaded channel data according to a switching direction indicated by the first switching instruction.

Here, the first switching instruction is a switching instruction for the channel identifier. In the present disclosure, the channel data corresponding to the second window and the channel data corresponding to the third window are also loaded when the channel data corresponding to the first window is displayed. In such case, when the first switching instruction for the channel identifier is detected, for example, the channel identifier that the first switching instruction points to is in the second window or the third window, because the channel data corresponding to the second window or the channel data corresponding to the third window have been loaded to a cache in advance, the displayed channel data may be rapidly switched to the channel data of the second window or the channel data of the third window for the user to rapidly browse in any direction.

In some embodiments, the operation that the displayed channel data is switched to the channel data corresponding to the second window or the channel data corresponding to the third window based on the loaded channel data according to the switching direction indicated by the first switching instruction may include that:

when the switching direction indicated by the first switching instruction is a first direction, the displayed channel data is switched to the channel data corresponding to the second window based on the loaded channel data; or, when the switching direction indicated by the first switching instruction is a second direction, the displayed channel data is switched to the channel data corresponding to the third window based on the loaded channel data, the second direction being a direction opposite to the first direction.

For example, the first direction may be a direction pointing to the above the first window, and when the switching direction indicated by the first switching instruction is the first direction, the displayed channel data may be switched to the channel data of the second window.

If the first direction refers to the direction pointing to the above the first window, the second direction is a direction pointing to the below the first window. When the switching direction indicated by the first switching instruction is the second direction, the displayed channel data is switched to the channel data of the third window.

In addition, it is to be noted that, in the embodiment of the present disclosure, channel data of a present display window and channel data of two windows adjacent to the present display window are cached in a memory of the display device. After the window is switched according to the first switching instruction, originally cached channel data neither belonging to the present display window nor the two windows adjacent to the present display window may be removed.

As mentioned above, because the channel data corresponding to the second window or the channel data corresponding to the third window have been loaded to the cache in advance, the displayed channel data may be rapidly switched to the channel data of the second window or the channel data of the third window for the user to rapidly browse in any direction, and the user experience may be improved. In addition, in the manner of removing the data neither belonging to the present display window nor the two windows adjacent to the present display window based on the first switching instruction, the memory may also be released in real time, so that the displaying fluency of the loaded data may be improved.

FIG. 3 is a second example diagram of an EPG interface according to an embodiment of the present disclosure. As illustrated in FIG. 3, the focus data is switched from program data corresponding to "channel 4" belonging to the first window at present time in FIG. 2 to program data corresponding to "channel 7" in the third window at the present time. When the focus is continued to be regulated to "channel 8" in the third window, namely the focus position is regulated to a middle refresh point (middle loading point), channel data of the window adjacent to the third window (window that "channel 8" to "channel 12" belong to) is triggered to be loaded. It is to be noted that the channel data presently displayed on the display device is channel data corresponding to the window that "channel 7" to "channel 9" belong to and channel data corresponding to a window that "channel 4" to "channel 6" belong to and channel data corresponding to the window that "channel 10" to "channel 12" belong to are also loaded in the display device. The channel data in the window that "channel 1" to "channel 3" belong to is removed from the cache.

In some embodiments, the method may further include that:

a second switching instruction acting on the program data of the channel data corresponding to the first window is detected; and program data in a switching direction indicated by the second switching instruction is loaded, and the presently displayed program data is switched to the loaded program data.

For example, the second switching instruction is a switching instruction for the program data, for example, a page turning instruction for the program data distributed in different data pages in different time zones. The data page where the program data is located belongs to a sub-interface in the first window.

In the present disclosure, the program data corresponding to the channel identifier in the first window in the present time zone is loaded and displayed only. Therefore, the display device, after detecting the second switching instruction, is required to load the program data of the time zone indicated by the second switching instruction. For example, the second switching instruction indicates program data of a next data page or program data of a previous adjacent data page. The display device, after loading the program data of the time zone indicated by the second switching instruction, is switched to display the sub-interface where the program data is located.

It can be understood that, in the present disclosure, when the time zone is switched, only a small amount of program data corresponding to the channel identifier is required to be loaded and displayed, so that the displaying speed of the program data in the corresponding time zone may be increased, and non-fluency phenomena may be reduced.

In one or more embodiments, the operation that the program data in the switching direction indicated by the second switching instruction is loaded and the presently displayed program data is switched to the loaded program data includes that:

when the switching direction indicated by the second switching instruction is a third direction, program data in a time zone earlier than a time zone corresponding to the presently displayed program data is loaded and displayed;

or, when the switching direction indicated by the second switching instruction is a fourth direction, program data in a time zone later than a time zone corresponding to the presently displayed program data is loaded and displayed, the fourth direction being a direction opposite to the third direction.

For example, the third direction may be a direction pointing to the left of the first window, and when the switching direction indicated by the second switching instruction is the third direction, the displayed program data may be switched to the program data in a time zone earlier than the present time zone.

If the fourth direction refers to a direction pointing to the right of the first window, when the switching direction indicated by the second switching instruction is the fourth direction, the displayed program data may be switched to the program data in a time zone later than the present time zone.

It is to be noted that, in the embodiment of the present disclosure, when the program data is switched according to the second switching instruction, the channel identifier may not change and the loaded program is only the program data in the data page corresponding to the switching direction indicated by the switching instruction in the program data corresponding to the channel identifier.

In addition, it is to be noted that, in the embodiment of the present disclosure, after the display device switches the time zone of the program data according to the second switching instruction, the program data, cached in the memory of the display device, of the previous time zone may also be removed to reduce memory occupation.

It can be understood that, in the present disclosure, when time zones are switched left and right, it is only necessary to load and display a small amount of program data indicated by the switching direction of the switching instruction in the program data corresponding to the channel identifier in the first window that is presently displayed, so that the displaying speed of the program data in the corresponding time zone may be increased, non-fluency phenomena may be reduced, and the user experience may be reduced.

FIG. 4 is a third example diagram of an EPG interface according to an embodiment of the present disclosure. As illustrated in FIG. 4, the program data presently displayed on the display interface is the program data corresponding to "channel 4" to "channel 6" in the first window in the present time zone (10:00 to 11:00), and the program data of the time zone 10:00 to 11:00 may occupy a data page of the program data. When the second switching instruction pointing to the fourth direction is detected, the program data (for example, in a time zone 11:00 to 12:00) later than the present time zone is loaded and displayed, and the program data in the time zone 11:00 to 12:00 may occupy another data page of the program data. It can be seen from FIG. 4 that, when the program data is switched, only the program data in the first window that is presently displayed is loaded and the program data in the adjacent second window and third window is not loaded.

Figure 5:
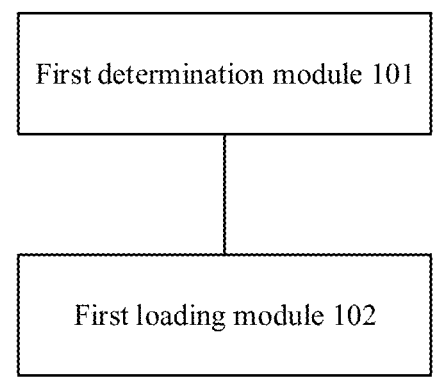
FIG. 5 is a diagram of a device for loading an EPG according to an embodiment of the present disclosure.

FIG. 5 is a diagram of a device for loading an EPG according to an embodiment of the present disclosure. Referring to FIG. 5, the device for loading the EPG includes a first determination module 101 and a first loading module 102.

The first determination module 101 is configured to determine, based on a channel presently selected by a display device, channel data corresponding to a first window where the channel is located. The channel data includes a channel identifier and program data.

The first loading module 102 is configured to load channel data corresponding to a second window and channel data corresponding to a third window when the channel data corresponding to the first window is displayed. The second window and the third window are windows adjacent to the first window in opposite directions, respectively.

Optionally, the device may further include a first detection module 103 and a switching module 104.

The first detection module 103 is configured to detect a first switching instruction acting on the channel identifier of the channel data corresponding to the first window.

The switching module 104 is configured to switch, based on the loaded channel data, the displayed channel data to the channel data corresponding to the second window or the channel data corresponding to the third window according to a switching direction indicated by the first switching instruction.

Optionally, the switching module 104 is specifically configured to, when the switching direction indicated by the first switching instruction is a first direction, switch the displayed channel data to the channel data corresponding to the second window based on the loaded channel data, or, when the switching direction indicated by the first switching instruction is a second direction, switch the displayed channel data to the channel data corresponding to the third window based on the loaded channel data, the second direction being a direction opposite to the first direction.

Optionally, the first loading module 102 is specifically configured to, when a focus position is at a middle of a channel identifier region of the channel data corresponding to the first window, load the channel data corresponding to the second window and the channel data corresponding to the third window.

Optionally, the device further includes:
a second detection module 105, configured to detect a second switching instruction acting on the program data of the channel data corresponding to the first window; and
a second loading module 106, configured to load program data in a switching direction indicated by the second switching instruction and switch the presently displayed program data to the loaded program data.

Optionally, the second loading module 106 is specifically configured to, when the switching direction indicated by the second switching instruction is a third direction, load and display program data in a time zone earlier than a time zone corresponding to the presently displayed program data, or, when the switching direction indicated by the second switching instruction is a fourth direction, load and display program data in a time zone later than the time zone corresponding to the presently displayed program data, the fourth direction being a direction opposite to the third direction.

With respect to the device in the above embodiment, the specific manners for performing operations for individual modules therein have been described in detail in the embodiment regarding the method, which will not be elaborated herein.

Figure 6:
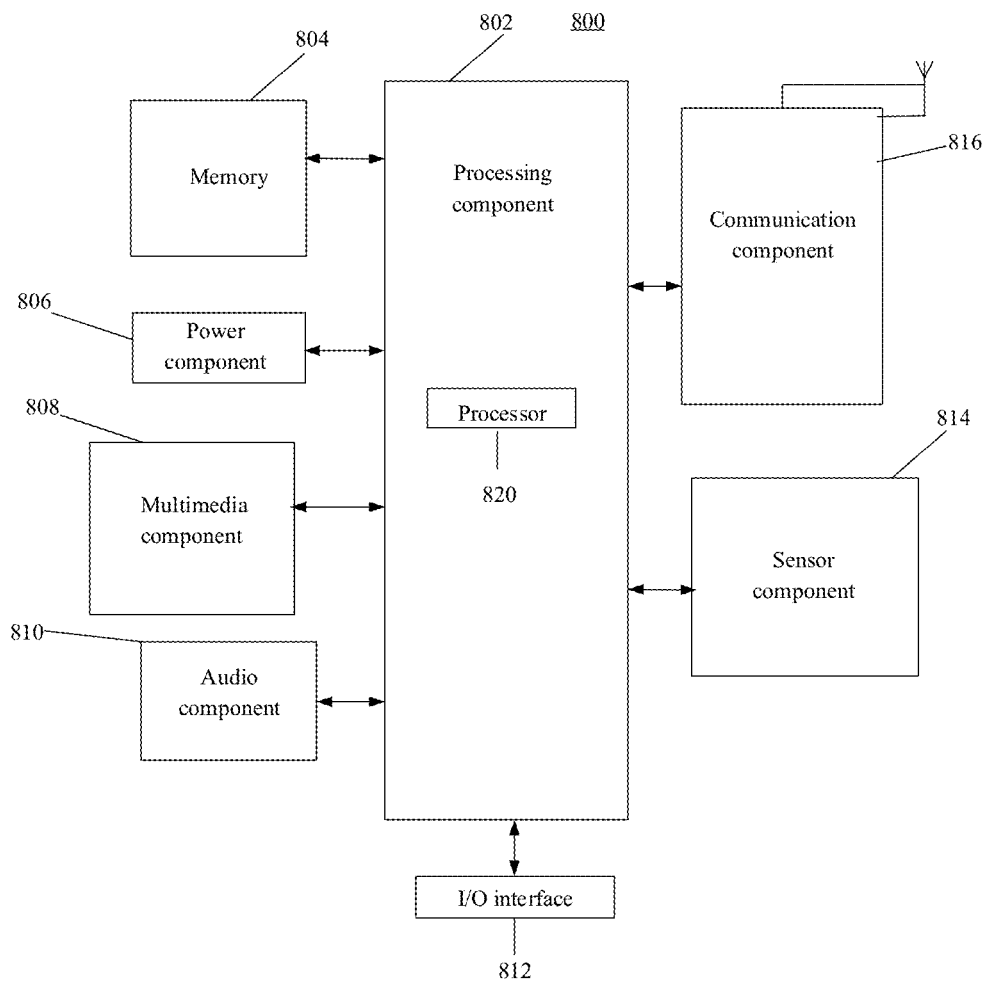
FIG. 6 is a block diagram of a display device according to an embodiment of the present disclosure.

FIG. 6 is a block diagram of a display device 800 according to an embodiment of the present disclosure. For example, the device 800 may be a smart television.

Referring to FIG. 6, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a Wireless Fidelity (Wi-Fi) network, a 2nd-Generation (2G) or 3rd-Generation (3G) network or a combination thereof. In some embodiments of the present application, the communication component 816 receives a broadcast signal or broadcast associated information from an external broadcast management system through a broadcast channel. In some embodiments of the present disclosure, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments of the present disclosure, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, instructions in the storage medium are executed by a processor of a display device to enable the display device to execute a control method, the method including that:

channel data corresponding to a first window where a channel presently selected by a display device is located is determined according to the channel, the channel data including a channel identifier and program data; and when the channel data corresponding to the first window is displayed, channel data corresponding to a second window and channel data corresponding to a third window are loaded, the second window and the third window being windows adjacent to the first window in opposite directions, respectively.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for loading an electronic program guide (EPG), comprising:

determining, based on a channel presently selected by a display device, first channel data corresponding to a first window where the channel is located;

loading second channel data corresponding to a second window and third channel data corresponding to a third window in background when the first channel data corresponding to the first window is displayed, wherein the second window and the third window are windows adjacent to the first window in opposite directions, respectively, the first window, the second window and the third window correspond to channel data of different channels, and the channel data comprises a channel identifier and program data, and each of the first window, the second window and the third window includes a respective plurality of channel identifiers and program data corresponding to the channel identifiers in a present time zone, wherein loading the second channel data corresponding to the second window and the third channel data corresponding to the third window in background comprises:

in response to detecting a focus position at a middle of a channel identifier region of the first channel data corresponding to the first window, loading the second channel data corresponding to the second window and the third channel data corresponding to the third window in background, and simultaneously, the first channel data corresponding to the first window is displayed on the display device;

detecting a first switching instruction acting on a channel identifier of the first channel data corresponding to the first window;

switching displayed channel data to the second channel data corresponding to the second window or the third channel data corresponding to the third window according to a switching direction indicated by the first switching instruction;

detecting a second switching instruction acting on the program data of the first channel data corresponding to the first window;

loading program data in a switching direction indicated by the second switching instruction; and switching presently displayed program data to the loaded program data, and wherein, when loading the program data in the switching direction indicated by the second switching instruction, only the program data in the first window that is presently displayed is loaded and program data in the second window and third window is not loaded.

2. The method of claim 1, wherein switching the displayed channel data to the second channel data corresponding to the second window or the third channel data corresponding to the third window according to the switching direction indicated by the first switching instruction comprises:

in response to determining that the first switching instruction indicates a first direction, switching the displayed channel data to the second channel data corresponding to the second window based on the loaded second channel data;

or, in response to determining that the first switching instruction indicates a second direction, switching the displayed channel data to the third channel data corresponding to the third window based on loaded third channel data, wherein the second direction is a direction opposite to a first direction.

3. The method of claim 1, wherein loading the program data in the switching direction indicated by the second switching instruction and switching the presently displayed program data to the loaded program data comprises:

in response to determining that the second switching instruction indicates a third direction, loading and displaying program data in a time zone earlier than a time zone corresponding to the presently displayed program data;

or, in response to determining that the second switching instruction indicates a fourth direction, loading and displaying program data in a time zone later than a time zone corresponding to the presently displayed program data, wherein the fourth direction is a direction opposite to a third direction.

4. The method of claim 3, wherein the method further comprises:

after the presently displayed program data is switched to program data of a time zone based on the second switching instruction, removing the program data of a time zone prior to the switch.

5. The method of claim 1, wherein the channel identifier is information related to the channel, and includes at least one of a channel number identifier, a channel icon identifier, or a channel owner.

6. The method of claim 1, wherein, when the focus position is at the middle of the channel identifier region of the first channel data corresponding to the first window, the channel identifier which is at in the middle of the channel identifier region is located at a middle loading point.

7. The method of claim 1, wherein the method further comprises:

after the displayed channel data is switched to the second channel data corresponding to the second window or the third channel data corresponding to the third window according to the switching direction indicated by the first switching instruction, removing originally loaded channel data neither belonging to a present display window nor two windows adjacent to the present display window.

8. A device for loading an electronic program guide (EPG), comprising:

a processor; and a memory storing instructions executable by the processor, wherein the processor is configured to:

determine, based on a channel presently selected by a display device, first channel data corresponding to a first window where the channel is located; and load second channel data corresponding to a second window and third channel data corresponding to a third window in background when the first channel data corresponding to the first window is displayed, wherein the second window and the third window are windows adjacent to the first window in opposite directions, respectively, the first window, the second window and the third window correspond to channel data of different channels, and the channel data comprises a channel identifier and program data, and each of the first window, the second window and the third window includes a respective plurality of channel identifiers and program data corresponding to channel identifiers in a present time zone, wherein the processor is further configured to:

in response to detecting a focus position at a middle of a channel identifier region of the first channel data corresponding to the first window, load the second channel data corresponding to the second window and the third channel data corresponding to the third window in background, and simultaneously, the first channel data corresponding to the first window is displayed on the display device detect a first switching instruction acting on a channel identifier of the first channel data corresponding to the first window;

switch displayed channel data to the second channel data corresponding to the second window or the third channel data corresponding to the third window according to a switching direction indicated by the first switching instruction;

detect a second switching instruction acting on the program data of the first channel data corresponding to the first window;

load program data in a switching direction indicated by the second switching instruction; and switch presently displayed program data to loaded program data, and wherein, when loading the program data in the switching direction indicated by the second switching instruction, only the program data in the first window that is presently displayed is loaded and program data in the second window and third window is not loaded.

9. The device of claim 8, wherein the processor is specifically configured to:

in response to determining that the first switching instruction indicates a first direction, switch the displayed channel data to the second channel data corresponding to the second window based on loaded second channel data;

or, in response to determining that the first switching instruction indicates a second direction, switch the displayed channel data to the third channel data corresponding to the third window based on loaded third channel data, wherein the second direction is a direction opposite to a first direction.

10. The device of claim 9, wherein the processor is specifically configured to:

in response to determining that the second switching instruction indicates a third direction, load and display program data in a time zone earlier than a time zone corresponding to the presently displayed program data;

or, in response to determining that the second switching instruction indicates a fourth direction, load and display program data in a time zone later than a time zone corresponding to the presently displayed program data, wherein the fourth direction is a direction opposite to a third direction.

11. A non-transitory computer-readable storage medium having stored therein instructions that, when executed by a processor of a computer, cause the computer to:

determine, based on a channel presently selected by a display device, first channel data corresponding to a first window where the channel is located; and load second channel data corresponding to a second window and third channel data corresponding to a third window in background when the first channel data corresponding to the first window is displayed, wherein the second window and the third window are windows adjacent to the first window in opposite directions, respectively, the first window, the second window and the third window correspond to channel data of different channels, and the channel data comprises a channel identifier and program data, and each of the first window, the second window and the third window includes a respective plurality of channel identifiers and program data corresponding to channel identifiers in a present time zone, wherein the instructions further cause the computer to:

in response to detecting a focus position at a middle of a channel identifier region of the first channel data corresponding to the first window, load the second channel data corresponding to the second window and the third channel data corresponding to the third window in background, and simultaneously, the first channel data corresponding to the first window is displayed on the display device;

detect a first switching instruction acting on a channel identifier of the first channel data corresponding to the first window;

switch, based on loaded channel data, the displayed channel data to the second channel data corresponding to the second window, or the third channel data corresponding to the third window, according to a switching direction indicated by the first switching instruction;

detect a second switching instruction acting on the program data of the first channel data corresponding to the first window; and load program data in a switching direction indicated by the second switching instruction and switch presently displayed program data to the loaded program data, and wherein, when loading the program data in the switching direction indicated by the second switching instruction, only the program data in the first window that is presently displayed is loaded and program data in the second window and third window is not loaded.

12. The non-transitory computer-readable storage medium of claim 11, wherein the instructions further cause the computer to:

in response to determining that the first switching instruction indicates a first direction, switch the displayed channel data to the second channel data corresponding to the second window based on the loaded second channel data; or, in response to determining that the first switching instruction indicates a second direction, switch the displayed channel data to the third channel data corresponding to the third window based on the loaded third channel data, wherein the second direction is a direction opposite to a first direction.

13. The non-transitory computer-readable storage medium of claim 12, wherein the instructions further cause the computer to:

in response to determining that the second switching instruction indicates a third direction, load and display program data in a time zone earlier than a time zone corresponding to the presently displayed program data; or, in response to determining that the second switching instruction indicates a fourth direction, load and display program data in a time zone later than a time zone corresponding to the presently displayed program data, wherein the fourth direction is a direction opposite to a third direction.

* * * * *